(12) United States Patent
Inoue

(10) Patent No.: US 11,608,884 B2  
(45) Date of Patent: Mar. 21, 2023

(54) VEHICLE DRIVE DEVICE

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/419,968

(22) PCT Filed: Mar. 27, 2020

(86) PCT No.: PCT/JP2020/014357  
§ 371 (c)(1),  
(2) Date: Jun. 30, 2021

(87) PCT Pub. No.: WO2020/203909  
PCT Pub. Date: Oct. 8, 2020

(65) Prior Publication Data  
US 2022/0074487 A1    Mar. 10, 2022

(30) Foreign Application Priority Data

Mar. 29, 2019  (JP) .............................. JP2019-066933

(51) Int. Cl.  
*F16H 57/04* (2010.01)  
*H02K 5/20* (2006.01)  
(Continued)

(52) U.S. Cl.  
CPC ........... *F16H 57/0471* (2013.01); *B60K 1/00* (2013.01); *F16H 57/043* (2013.01);  
(Continued)

(58) Field of Classification Search  
None  
See application file for complete search history.

(56) References Cited

U.S. PATENT DOCUMENTS

| | | |
|---|---|---|
| 5,372,213 A | 12/1994 | Hasebe et al. |
| 8,909,402 B2 * | 12/2014 | Miyamoto ............. H02K 9/193 903/902 |

(Continued)

FOREIGN PATENT DOCUMENTS

| | | |
|---|---|---|
| EP | 3 517 745 A1 | 7/2019 |
| JP | H06-98417 A | 4/1994 |

(Continued)

OTHER PUBLICATIONS

Jun. 30, 2020 Search Report issued in International Patent Application No. PCT/JP2020/014357.

(Continued)

*Primary Examiner* — Dirk Wright  
(74) *Attorney, Agent, or Firm* — Oliff PLC

(57) ABSTRACT

A vehicle drive device includes: a rotary electric machine; a drive transmission mechanism provided in a power transmission path connecting a rotor shaft of the rotary electric machine and a wheel; a first hydraulic pump driven by a driving force transmitted through the power transmission path; a second hydraulic pump driven by a driving force source independent of the power transmission path; a first oil passage that supplies oil discharged from the first hydraulic pump to a rotor bearing that supports the rotor shaft such that the rotor shaft is rotatable; and a second oil passage that supplies oil discharged from the second hydraulic pump to an inner peripheral surface of the rotor shaft.

9 Claims, 4 Drawing Sheets

(51) Int. Cl.
  *B60K 1/00*      (2006.01)
  *H02K 7/00*      (2006.01)
  *H02K 7/08*      (2006.01)
  *H02K 7/116*     (2006.01)
  *H02K 9/193*     (2006.01)
  *B60K 17/16*     (2006.01)
  *F16H 57/02*     (2012.01)

(52) U.S. Cl.
  CPC ..... *F16H 57/0426* (2013.01); *F16H 57/0439* (2013.01); *F16H 57/0476* (2013.01); *H02K 5/203* (2021.01); *H02K 7/006* (2013.01); *H02K 7/083* (2013.01); *H02K 7/116* (2013.01); *H02K 9/193* (2013.01); *B60K 17/165* (2013.01); *B60K 2001/001* (2013.01); *F16H 57/0417* (2013.01); *F16H 2057/02034* (2013.01); *F16H 2057/02052* (2013.01)

(56) References Cited

U.S. PATENT DOCUMENTS

| | | | | |
|---|---|---|---|---|
| 9,242,637 | B2* | 1/2016 | Miyamoto | B60W 20/00 |
| 10,746,282 | B2* | 8/2020 | Ito | F16H 48/08 |
| 11,114,921 | B2* | 9/2021 | Ito | B60K 7/0007 |
| 11,353,103 | B2* | 6/2022 | Kawanishi | F16H 57/0441 |

FOREIGN PATENT DOCUMENTS

| | | |
|---|---|---|
| JP | 2008-312343 A | 12/2008 |
| JP | 2013-162674 A | 8/2013 |
| JP | 2017-114477 A | 6/2017 |
| JP | 2018-26974 A | 2/2018 |
| JP | 2018-57243 A | 4/2018 |
| WO | 2018/030372 A1 | 2/2018 |
| WO | 2018/061443 A1 | 4/2018 |

OTHER PUBLICATIONS

Jan. 12, 2022 Extended European Search Report issued in European Patent Application No. 20782218.0.

* cited by examiner

VEHICLE DRIVE DEVICE

TECHNICAL FIELD

The present disclosure relates to a vehicle drive device. The vehicle drive device includes: a rotary electric machine that serves as a driving force source for wheels; a drive transmission mechanism provided in a power transmission path connecting the rotary electric machine and the wheels; a first hydraulic pump driven by a driving force transmitted through the power transmission path; and a second hydraulic pump driven by a driving force source independent of the power transmission path.

BACKGROUND ART

An example of such a vehicle drive device is disclosed in Patent Document 1 below. Hereinafter, in the description of the background art, reference numerals in Patent Document 1 are used in parentheses.

A vehicle drive device (1) of Patent Document 1 includes a first oil passage (91) through which oil discharged from a first hydraulic pump (51) flows and a second oil passage (92) through which oil discharged from a second hydraulic pump (52) flows.

RELATED ART DOCUMENTS

Patent Documents

Patent Document 1: WO 2018/061443 (FIG. 6)

SUMMARY OF THE DISCLOSURE

Problem to be Solved by the Invention

In the vehicle drive device (1) of Patent Document 1, the first oil passage (91) includes an inner cooling oil passage (93) for cooling the rotary electric machine (10) from inside in the radial direction (R), and the second oil passage (92) includes an outer cooling oil passage (65) for cooling the rotary electric machine (10) from outside in the radial direction (R). That is, each of the first oil passage (91) and the second oil passage (92) includes an oil passage for cooling the rotary electric machine (10). Therefore, even in a situation where cooling of the rotary electric machine (10) is unnecessary, oil is supplied to at least one of the inner cooling oil passage (93) and the outer cooling oil passage (65).

Moreover, in the vehicle drive device (1) of Patent Document 1, lubrication oil is supplied to a bearing (B) that supports a rotating member such as a rotor shaft (16) of the rotary electric machine (10) such that the rotating member is rotatable. However, the timing of lubrication of the bearing (B) is not specified. That is, in the vehicle drive device (1) of Patent Document 1, oil may be supplied to the bearing (B) even when lubrication of the bearing (B) is unnecessary.

As described above, in the vehicle drive device (1) of Patent Document 1, the energy required for driving the hydraulic pumps (51, 52) for unnecessary oil supply results in an unnecessary loss, and energy efficiency of the vehicle drive device (1) decreases accordingly.

Thus, it is desired to realize a vehicle drive device capable of keeping energy loss due to unnecessary driving of the hydraulic pump small while increasing the energy efficiency.

Means for Solving the Problem

In view of the above, the characteristic configuration of a vehicle drive device is that the vehicle drive device includes:

a rotary electric machine having a stator core, a rotor core rotatably supported with respect to the stator core, and a tubular rotor shaft connected to the rotor core so as to rotate integrally with the rotor core, and serving as a driving force source for a wheel;

a drive transmission mechanism provided in a power transmission path connecting the rotor shaft and the wheel;

a first hydraulic pump driven by a driving force transmitted through the power transmission path;

a second hydraulic pump driven by a driving force source independent of the power transmission path;

a first oil passage that supplies oil discharged from the first hydraulic pump to a rotor bearing that supports the rotor shaft such that the rotor shaft is rotatable; and a second oil passage that supplies oil discharged from the second hydraulic pump to an inner peripheral surface of the rotor shaft.

According to this characteristic configuration, the first oil passage and the first hydraulic pump are provided as a hydraulic circuit for lubrication that supplies oil to the rotor bearing that supports the rotor shaft of the rotary electric machine such that the rotor shaft is rotatable, and the second oil passage and the second hydraulic pump are provided as a hydraulic circuit for cooling that supplies oil to the inner peripheral surface of the rotor shaft. This enables lubrication of the rotor bearing and cooling of the inner peripheral surface of the rotor shaft to be performed independently. Therefore, when lubrication of the rotor bearing is unnecessary, such as the case where the vehicle is stopped, the supply of oil from the first hydraulic pump to the rotor bearing can be stopped, and when cooling of the inner peripheral surface of the rotor shaft is unnecessary, such as the case where the temperature of the rotary electric machine is low, the supply of oil from the second hydraulic pump to the inner peripheral surface of the rotor shaft can be stopped. That is, when the supply of oil to either the inner peripheral surface of the rotor shaft or the rotor bearing is unnecessary, it is possible to avoid the oil from being supplied to both of them. As a result, the energy loss due to unnecessary driving of the hydraulic pump can be kept small, and therefore, the energy efficiency of the vehicle drive device can be increased.

MODES FOR CARRYING OUT THE DISCLOSURE

Figure 1:
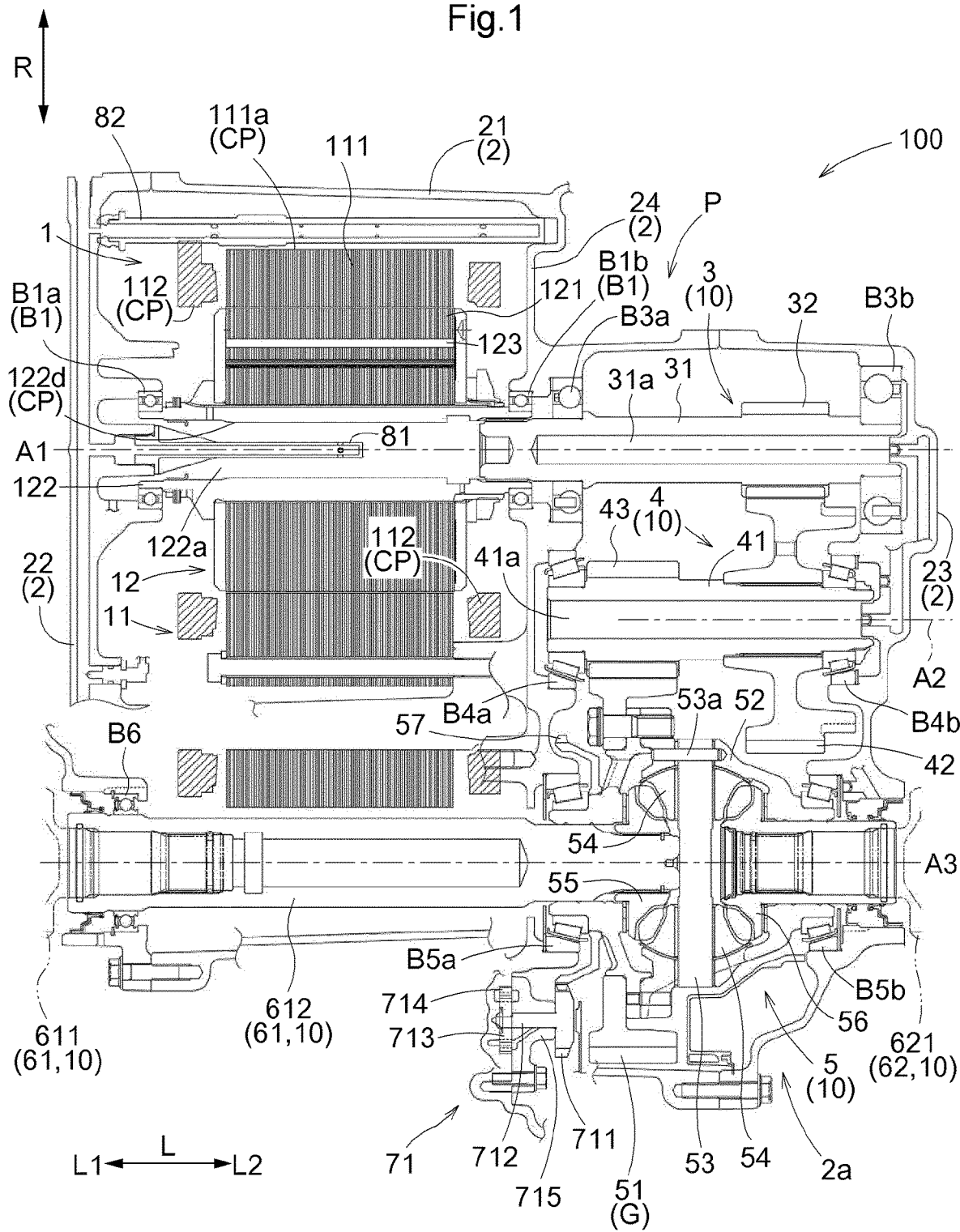
FIG. 1 is a sectional view taken along an axial direction of a vehicle drive device according to an embodiment.
Figure 2:
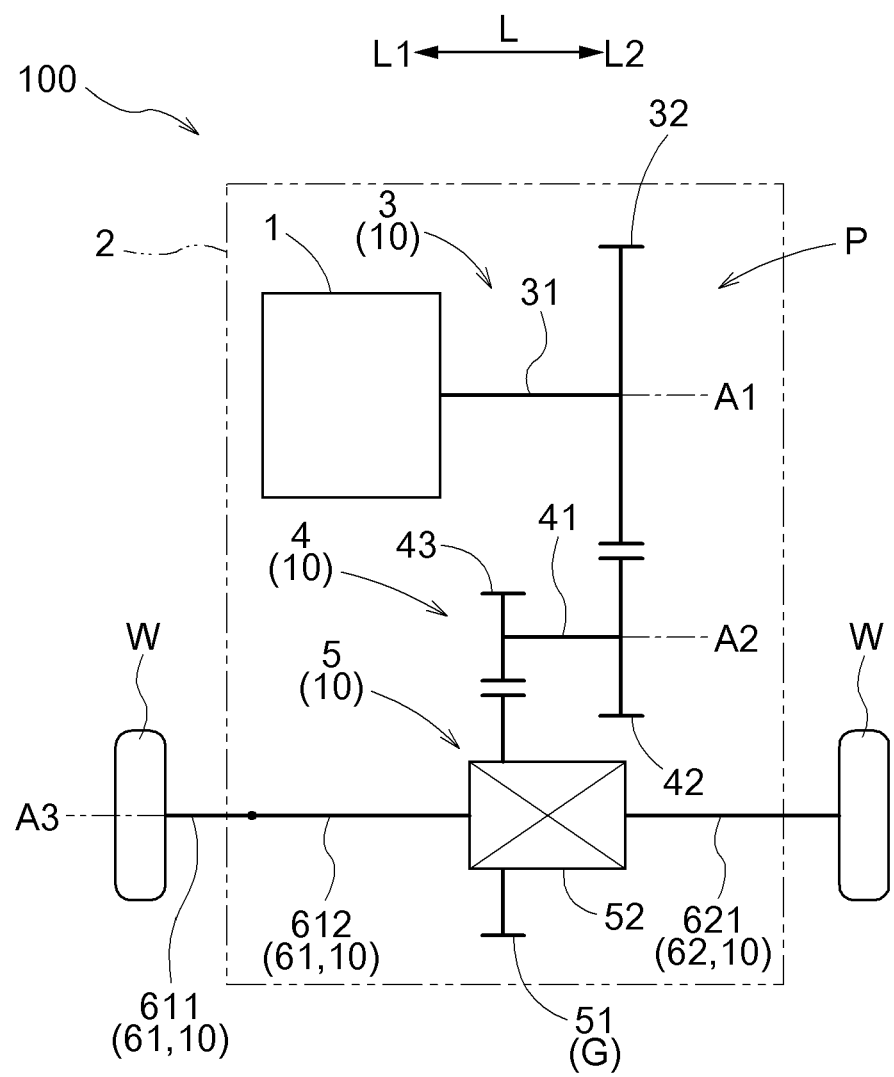
FIG. 2 is a skeleton diagram of the vehicle drive device according to the embodiment.

Hereinafter, a vehicle drive device 100 according to an embodiment will be described with reference to the drawings. As shown in FIGS. 1 and 2, the vehicle drive device 100 includes a rotary electric machine 1 serving as a driving force source for wheels W and a drive transmission mechanism 10 provided in a power transmission path P connecting the rotary electric machine 1 and the wheels W. In the present embodiment, the rotary electric machine 1 and the drive transmission mechanism 10 are housed in a case 2.

Further, in the present embodiment, the drive transmission mechanism 10 includes an input member 3, a counter gear mechanism 4, a differential gear mechanism 5, a first output member 61, and a second output member 62.

The rotary electric machine 1 is disposed on a first axis A1 serving as a rotation axis of the rotary electric machine 1. In the present embodiment, the input member 3 is also disposed on the first axis A1. The counter gear mechanism 4 is disposed on a second axis A2 serving as a rotation axis of the counter gear mechanism 4. The differential gear mechanism 5 is disposed on a third axis A3 serving as a rotation axis of the differential gear mechanism 5. In the present embodiment, the first output member 61 and the second output member 62 are also arranged on the third axis A3. The first axis A1, the second axis A2, and the third axis A3 are virtual axes that are different from each other and are arranged in parallel with each other.

In the following description, the direction parallel to the axes A1 to A3 will be referred to as an "axial direction L" of the vehicle drive device 100. In the axial direction L, the side, with respect to the input member 3, on which the rotary electric machine 1 is disposed will be referred to as a "first side L1 in the axial direction", and the opposite side will be referred to as a "second side L2 in the axial direction". Further, the direction orthogonal to each of the first axis A1, the second axis A2, and the third axis A3 will be referred to as a "radial direction R" with respect to each axis. When it is not necessary to distinguish which axis is used as a reference, or when it is clear which axis is used as a reference, the direction may be simply referred to as a "radial direction R".

As shown in FIG. 1, in the present embodiment, the case 2 has a peripheral wall portion 21, a first side wall portion 22, a second side wall portion 23, and a partition wall portion 24. The peripheral wall portion 21 has a tubular shape that surrounds the outside of the rotary electric machine 1 and the drive transmission mechanism 10 in the radial direction R. The first side wall portion 22 and the second side wall portion 23 are provided so as to extend along the radial direction R. The first side wall portion 22 is fixed to an end portion of the peripheral wall portion 21 on the first side L1 in the axial direction so as to close the opening of the peripheral wall portion 21 on the first side L1 in the axial direction. The second side wall portion 23 is fixed to an end portion of the peripheral wall portion 21 on the second side L2 in the axial direction so as to close the opening of the peripheral wall portion 21 on the second side L2 in the axial direction.

The partition wall portion 24 is provided so as to partition, in the axial direction L, a space inside the peripheral wall portion 21 in the radial direction R and between the first side wall portion 22 and the second side wall portion 23. In the present embodiment, the rotary electric machine 1 is disposed between the partition wall portion 24 and the first side wall portion 22. The drive transmission mechanism 10 is disposed between the partition wall portion 24 and the second side wall portion 23.

The rotary electric machine 1 has a stator 11 and a rotor 12. The "rotary electric machine" is used as a concept including any of a motor (electric motor), a generator, and a motor generator that functions as both a motor and a generator as necessary.

The stator 11 has a stator core 111 fixed to a non-rotating member (for example, the case 2). The rotor 12 has a rotor core 121 that can rotate with respect to the stator 11 (stator core 111), and a rotor shaft 122 that is connected to the rotor core 121 so as to rotate integrally with the rotor core 121. In the present embodiment, the rotary electric machine 1 is a revolving field-type rotary electric machine. Therefore, a coil is wound around the stator core 111 such that coil end portions 112 are provided that project from the stator core 111 to both sides in the axial direction L (the first side L1 in the axial direction and the second side L2 in the axial direction). A permanent magnet 123 is provided in the rotor core 121. Further, in the present embodiment, since the rotary electric machine 1 is an inner rotor-type rotary electric machine, the rotor core 121 is disposed inside the stator core 111 in the radial direction R. The rotor shaft 122 is connected to the inner peripheral surface of the rotor core 121.

The rotor shaft 122 is a rotating member that rotates around the first axis A1. The rotor shaft 122 has a tubular shape extending along the axial direction L. The rotor shaft 122 is rotatably supported by a rotor bearing B1. In the present embodiment, the rotor shaft 122 is disposed so as to project from the rotor core 121 to both sides in the axial direction L. The rotor bearing B1 includes a first rotor bearing B1a that supports a portion of the rotor shaft 122 that projects from the rotor core 121 to the first side L1 in the axial direction such that the portion is rotatable, and a second rotor bearing B1b that supports a portion of the rotor shaft 122 that projects from the rotor core 121 to the second side L2 in the axial direction such that the portion is rotatable. In the illustrated example, the end portion of the rotor shaft 122 on the first side L1 in the axial direction is rotatably supported with respect to the first side wall portion 22 of the case 2 via the first rotor bearing B1a. The end portion of the rotor shaft 122 on the second side L2 in the axial direction is rotatably supported with respect to the partition wall portion 24 of the case 2 via the second rotor bearing B1b.

Further, in the present embodiment, both end surfaces of the rotor shaft 122 in the axial direction L are open. The internal space of the rotor shaft 122 functions as a rotor shaft oil passage 122a through which oil flows.

The input member 3 is an input element of the drive transmission mechanism 10. The input member 3 has an input shaft 31 and an input gear 32.

The input shaft 31 is a rotating member that rotates around the first axis A1. The input shaft 31 is provided so as to extend along the axial direction L. In the present embodiment, the input shaft 31 is inserted into a through hole that passes through the partition wall portion 24 of the case 2 in the axial direction L. The end portion of the input shaft 31 on the first side L1 in the axial direction is connected to the end portion of the rotor shaft 122 on the second side L2 in the axial direction. In the illustrated example, the end portion of the input shaft 31 on the first side L1 in the axial direction is inserted to the end portion of the rotor shaft 122 on the second side L2 in the axial direction such that the input shaft 31 is located inside the rotor shaft 122 in the radial direction R, and the end portions are connected to each other by spline engagement.

In the present embodiment, the input shaft 31 is rotatably supported with respect to the case 2 via a first input bearing B3a and a second input bearing B3b. Specifically, a portion of the input shaft 31 more toward the first side L1 in the axial direction than the central portion of the input shaft 31 in the axial direction L and more toward the second side L2 in the axial direction than the connecting portion with the rotor shaft 122 is rotatably supported with respect to the partition wall portion 24 of the case 2 via the first input bearing B3a. The end portion of the input shaft 31 on the second side L2 in the axial direction is rotatably supported with respect to the second side wall portion 23 of the case 2 via the second input bearing B3b.

Further, in the present embodiment, the input shaft 31 has a tubular shape with the end surface on the second side L2 in the axial direction being open. The internal space of the input shaft 31 functions as an input shaft oil passage 31a through which oil flows.

The input gear 32 is a gear that transmits the driving force from the rotary electric machine 1 to the counter gear mechanism 4. The input gear 32 is connected to the input shaft 31 so as to rotate integrally with the input shaft 31. In the present embodiment, the input gear 32 is formed integrally with the input shaft 31. Further, in the present embodiment, the input gear 32 is disposed between the first input bearing B3a and the second input bearing B3b.

The counter gear mechanism 4 is disposed between the input member 3 and the differential gear mechanism 5 in the power transmission path P. The counter gear mechanism 4 has a counter shaft 41, a first counter gear 42, and a second counter gear 43.

The counter shaft 41 is a rotating member that rotates around the second axis A2. The counter shaft 41 is provided so as to extend along the axial direction L. In the present embodiment, the counter shaft 41 is rotatably supported with respect to the case 2 via a first counter bearing B4a and a second counter bearing B4b. Specifically, the end portion of the counter shaft 41 on the first side L1 in the axial direction is rotatably supported with respect to the partition wall portion 24 of the case 2 via the first counter bearing B4a. The end portion of the counter shaft 41 on the second side L2 in the axial direction is rotatably supported with respect to the second side wall portion 23 of the case 2 via the second counter bearing B4b.

In the present embodiment, the counter shaft 41 has a tubular shape with both end surfaces in the axial direction L being open. The internal space of the counter shaft 41 functions as a counter shaft oil passage 41a through which oil flows.

The first counter gear 42 is an input element of the counter gear mechanism 4. The first counter gear 42 meshes with the input gear 32 of the input member 3. The first counter gear 42 is connected to the counter shaft 41 so as to rotate integrally with the counter shaft 41. In the present embodiment, the first counter gear 42 is connected to the counter shaft 41 by spline engagement. Further, in the present embodiment, the first counter gear 42 is disposed between the first counter bearing B4a and the second counter bearing B4b and more toward the second side L2 in the axial direction than the second counter gear 43.

The second counter gear 43 is an output element of the counter gear mechanism 4. In the present embodiment, the second counter gear 43 has a smaller diameter than the first counter gear 42. The second counter gear 43 is connected to the counter shaft 41 so as to rotate integrally with the counter shaft 41. In the present embodiment, the second counter gear 43 is formed integrally with the counter shaft 41. Further, in the present embodiment, the second counter gear 43 is disposed between the first counter bearing B4a and the second counter bearing B4b and more toward the first side L1 in the axial direction than the first counter gear 42.

The differential gear mechanism 5 distributes the driving force transmitted from the rotary electric machine 1 side to the first output member 61 and the second output member 62. The differential gear mechanism 5 includes a differential input gear 51, a differential case 52, a pinion shaft 53, a pair of pinion gears 54, a first side gear 55, and a second side gear 56. In the present embodiment, the pair of pinion gears 54, the first side gear 55, and the second side gear 56 are all bevel gears.

The differential input gear 51 is an input element of the differential gear mechanism 5. The differential input gear 51 meshes with the second counter gear 43 of the counter gear mechanism 4. The differential input gear 51 is connected to the differential case 52 so as to rotate integrally with the differential case 52. In the present embodiment, an outer peripheral edge portion of the differential input gear 51 corresponds to a "maximum diameter portion" that is a portion, in the differential gear mechanism 5, having the largest dimension in the radial direction R. In the present embodiment, the rotary electric machine 1 is disposed on the first side L1 in the axial direction with respect to the differential input gear 51.

In the present embodiment, the differential input gear 51 corresponds to a "scraping gear G" that scrapes up oil in an oil storage portion 2a provided inside the case 2. The differential input gear 51 rotates to scrape up the oil stored in the oil storage portion 2a.

Then, the oil scraped up by the differential input gear 51 is supplied to gear meshing portions of the plurality of gears included in the drive transmission mechanism 10. In the present embodiment, the gear meshing portions of the plurality of gears included in the drive transmission mechanism 10 include a meshing portion between the input gear 32 and the first counter gear 42, a meshing portion between the second counter gear 43 and the differential input gear 51, and a meshing portion between the pair of pinion gears 54 and the first and second side gears 55 and 56.

The differential case 52 is a rotating member that rotates around the third axis A3. In the present embodiment, the differential case 52 is rotatably supported with respect to the case 2 via a first differential bearing B5a and a second differential bearing B5b. Specifically, the end portion of the differential case 52 on the first side L1 in the axial direction is rotatably supported with respect to the partition wall portion 24 of the case 2 via the first differential bearing B5a. The end portion of the differential case 52 on the second side L2 in the axial direction is rotatably supported with respect to the second side wall portion 23 of the case 2 via the second differential bearing B5b.

The differential case 52 is a hollow member. Inside the differential case 52, the pinion shaft 53, the pair of pinion gears 54, the first side gear 55, and the second side gear 56 are housed.

The pinion shaft 53 extends along the radial direction R with respect to the third axis A3. The pinion shaft 53 is inserted into the pair of pinion gears 54 and supports the pinion gears 54 such that the pinion gears 54 are rotatable. The pinion shaft 53 is disposed so as to pass through the differential case 52. The pinion shaft 53 is locked to the differential case 52 by a locking member 53a and rotates integrally with the differential case 52. In the illustrated example, the locking member 53a is a rod-shaped pin inserted into both the differential case 52 and the pinion shaft 53.

The pair of pinion gears 54 is attached to the pinion shaft 53 such that the pinion gears 54 face each other while being spaced along the radial direction R with respect to the third axis A3. The pair of pinion gears 54 is configured to be able to rotate about the pinion shaft 53 and able to rotate (revolve) about the third axis A3.

The first side gear 55 and the second side gear 56 are rotation elements after distribution in the differential gear mechanism 5. The first side gear 55 and the second side gear 56 are arranged so as to face each other with the pinion shaft 53 interposed therebetween while being spaced in the axial direction L. The first side gear 55 is disposed more toward the first side L1 in the axial direction than the second side gear 56. The first side gear 55 and the second side gear 56 are each configured to rotate in the circumferential direction in the internal space of the differential case 52. The first side gear 55 and the second side gear 56 mesh with the pair of pinion gears 54. The first side gear 55 is connected to the first output member 61 so as to rotate integrally with the first output member 61. On the other hand, the second side gear 56 is connected to the second output member 62 so as to rotate integrally with the second output member 62.

Each of the first output member 61 and the second output member 62 is drivingly connected to the wheel W. Each of the first output member 61 and the second output member 62 transmits the driving force distributed by the differential gear mechanism 5 to the wheel W.

In the present embodiment, the first output member 61 includes a first axle 611 and a relay member 612. The first axle 611 is drivingly connected to the wheel W on the first side L1 in the axial direction. The relay member 612 is a rotating member that rotates around the third axis A3. The relay member 612 is a shaft member extending in the axial direction L. The relay member 612 is inserted into a through hole that passes through the partition wall portion 24 of the case 2 in the axial direction L. The relay member 612 is rotatably supported with respect to the first side wall portion 22 of the case 2 via an output bearing B6. The end portion of the relay member 612 on the first side L1 in the axial direction is exposed to the outside of the case 2 through a through hole passing through the first side wall portion 22 of the case 2 in the axial direction L. The end portion of the relay member 612 on the first side L1 in the axial direction is connected to the first axle 611 so as to rotate integrally with the first axle 611. In the present embodiment, the relay member 612 has a tubular shape with the end surface on the first side L1 in the axial direction being open. The inner peripheral surface of the relay member 612 and the outer peripheral surface of the end portion of the first axle 611 on the second side L2 in the axial direction are provided with corresponding splines. The relay member 612 and the first axle 611 are connected so as to rotate integrally when the splines are engaged with each other. On the other hand, the end portion of the relay member 612 on the second side L2 in the axial direction is connected to the first side gear 55 of the differential gear mechanism 5 so as to rotate integrally with the first side gear 55. In the present embodiment, the outer peripheral surface of the end portion of the relay member 612 on the second side L2 in the axial direction and the inner peripheral surface of the first side gear 55 are provided with corresponding splines. The relay member 612 and the first side gear 55 are connected so as to rotate integrally when the splines are engaged with each other.

In the present embodiment, the second output member 62 includes a second axle 621. The second axle 621 is drivingly connected to the wheel W on the second side L2 in the axial direction. The second axle 621 is connected to the second side gear 56 so as to rotate integrally with the second side gear 56. In the present embodiment, the outer peripheral surface of the end portion of the second axle 621 on the first side L1 in the axial direction and the inner peripheral surface of the second side gear 56 are provided with corresponding splines. The second axle 621 and the second side gear 56 are connected so as to rotate integrally when the splines are engaged with each other.

Figure 3:
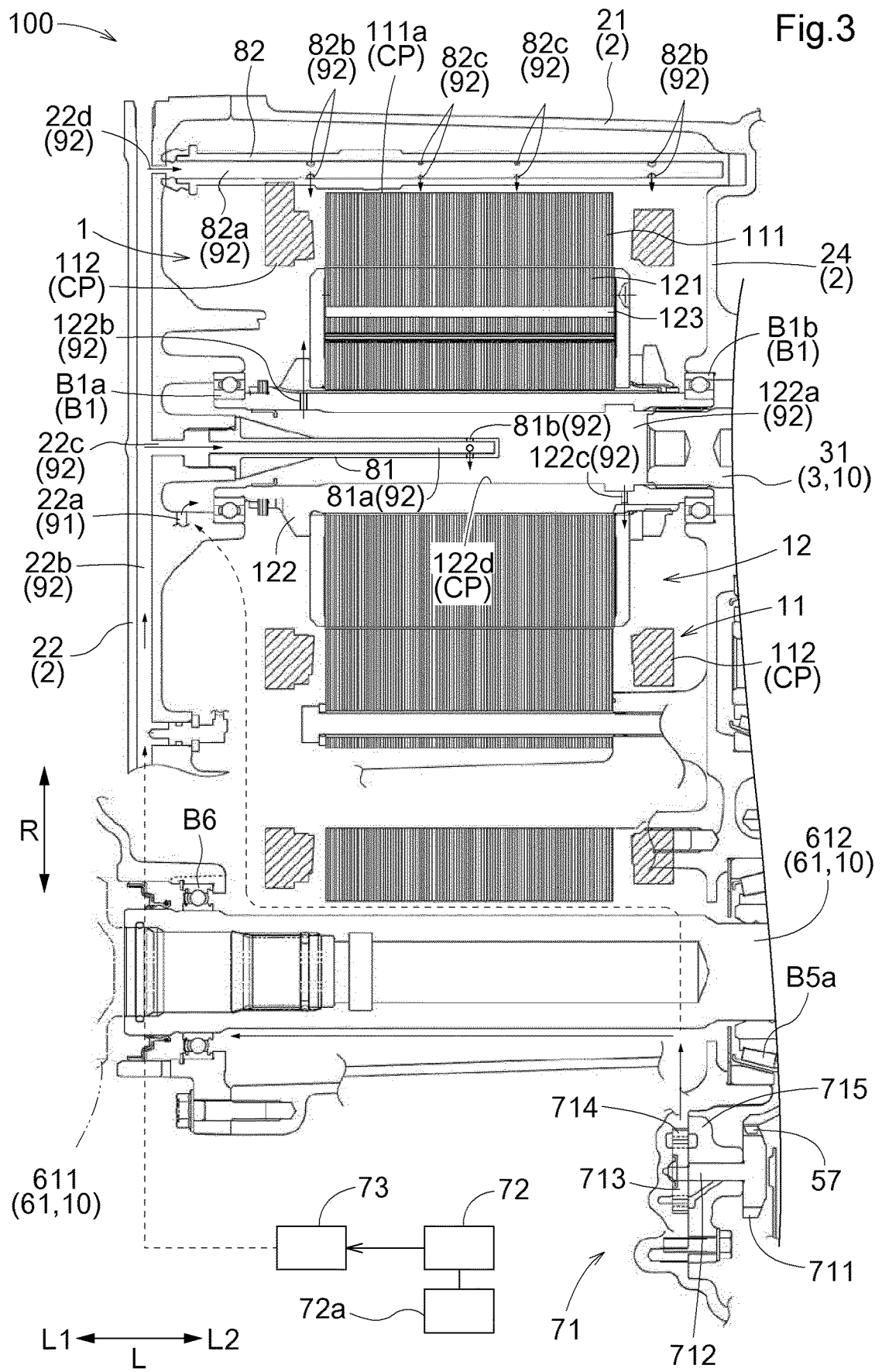
FIG. 3 is a diagram showing a part of a first oil passage and a second oil passage of the vehicle drive device according to the embodiment.

As shown in FIGS. 1 and 3, the vehicle drive device 100 includes a first hydraulic pump 71 driven by a driving force transmitted through the power transmission path P and a second hydraulic pump 72 driven by a dedicated driving force source independent of the power transmission path P. Each of the first hydraulic pump 71 and the second hydraulic pump 72 is a pump that pumps up oil stored in the oil storage portion 2a in the case 2 and discharges the pumped oil.

In the present embodiment, the first hydraulic pump 71 is housed in the case 2. Further, in the present embodiment, the first hydraulic pump 71 is a so-called mechanical hydraulic pump driven by rotation of a rotating member included in the drive transmission mechanism 10. The first hydraulic pump 71 includes a pump input gear 711, a pump drive shaft 712, an inner rotor 713, an outer rotor 714, and a pump cover 715.

The pump input gear 711 is an input element of the first hydraulic pump 71. The pump input gear 711 meshes with a pump drive gear 57 connected to the differential case 52 so as to rotate integrally with the differential case 52. The pump drive shaft 712 is connected to the pump input gear 711 so as to rotate integrally with the pump input gear 711. In the present embodiment, the pump input gear 711 is disposed at the end portion of the pump drive shaft 712 on the second side L2 in the axial direction. The inner rotor 713 is connected to the pump drive shaft 712 so as to rotate integrally with the pump drive shaft 712. In the present embodiment, the inner rotor 713 is disposed at the end portion of the pump drive shaft 712 on the first side L1 in the axial direction. The outer rotor 714 is disposed outside the inner rotor 713 in the radial direction R. Internal teeth provided on the inner peripheral surface of the outer rotor 714 mesh with external teeth provided on the outer peripheral surface of the inner rotor 713, and the outer rotor 714 rotates with the rotation of the inner rotor 713. The pump cover 715 is disposed so as to cover the inner rotor 713 and the outer rotor 714. The pump cover 715 supports the pump drive shaft 712 such that the pump drive shaft 712 is rotatable. Specifically, the pump drive shaft 712 is inserted into a through hole that passes through the pump cover 715 in the axial direction L.

As described above, in the present embodiment, the first hydraulic pump 71 is driven by the rotation of the differential case 52 of the differential gear mechanism 5. The rotation speed of the differential case 52 is lower than the rotation speed of the rotary electric machine 1 and the rotation speed of the counter gear mechanism 4. Therefore, in the configuration in which the first hydraulic pump 71 is driven by the rotation of the differential case 52, the rotation speed of the first hydraulic pump 71 can be kept low, compared with the configuration in which the first hydraulic pump 71 is driven by the rotary electric machine 1 or the counter gear mechanism 4. Accordingly, the energy loss due to the high-speed rotation of the first hydraulic pump 71 can be kept small, and therefore, the energy efficiency of the vehicle drive device 100 can be increased.

Further, in the present embodiment, the first hydraulic pump 71 is disposed at such a position that the first hydraulic pump 71 overlaps the differential gear mechanism 5 as seen in the axial direction along the axial direction L. Specifically, the inner rotor 713 and the outer rotor 714, which are the pump rotors of the first hydraulic pump 71, are disposed at such positions that the inner rotor 713 and the outer rotor 714 overlap the differential gear mechanism 5 as seen in the axial direction. Further, in the present embodiment, the first hydraulic pump 71 is disposed more toward the rotary electric machine 1 side in the axial direction L (first side L1 in the axial direction) than the differential input gear 51 of the differential gear mechanism 5 and more toward the differential gear mechanism 5 side in the axial direction L (second side L2 in the axial direction) than the central portion of the rotary electric machine 1 in the axial direction L. Specifically, the members constituting the first hydraulic pump 71 (here, the pump input gear 711, the pump drive shaft 712, the inner rotor 713, the outer rotor 714, and the pump cover 715) are arranged between the central portion of the rotary electric machine 1 in the axial direction L and the differential input gear 51, in the axial direction L. Here, regarding the arrangement of two elements, "overlap as seen in a specific direction" means that when a virtual straight line parallel to the direction of line of sight is moved in directions orthogonal to the virtual straight line, there is an area where the virtual straight line intersects both the two elements in at least one of the directions.

As shown in FIG. 3, in the present embodiment, the second hydraulic pump 72 is an electrically driven hydraulic pump driven by an electric motor 72*a*. That is, in the present embodiment, the electric motor 72*a* corresponds to the driving force source independent of the power transmission path P. As the electric motor 72*a*, for example, an alternating-current rotary electric machine driven by alternating-current power of a plurality of phases can be used. In this case, although not shown, the electric motor 72*a* is connected to a direct-current power supply via an inverter that converts power between direct-current power and alternating-current power, and the drive of the electric motor 72*a* is controlled via the inverter.

In the present embodiment, the second hydraulic pump 72 is stopped when the temperature of the inner peripheral surface 122*d* of the rotor shaft 122 is equal to or lower than a specified value.

Figure 4:
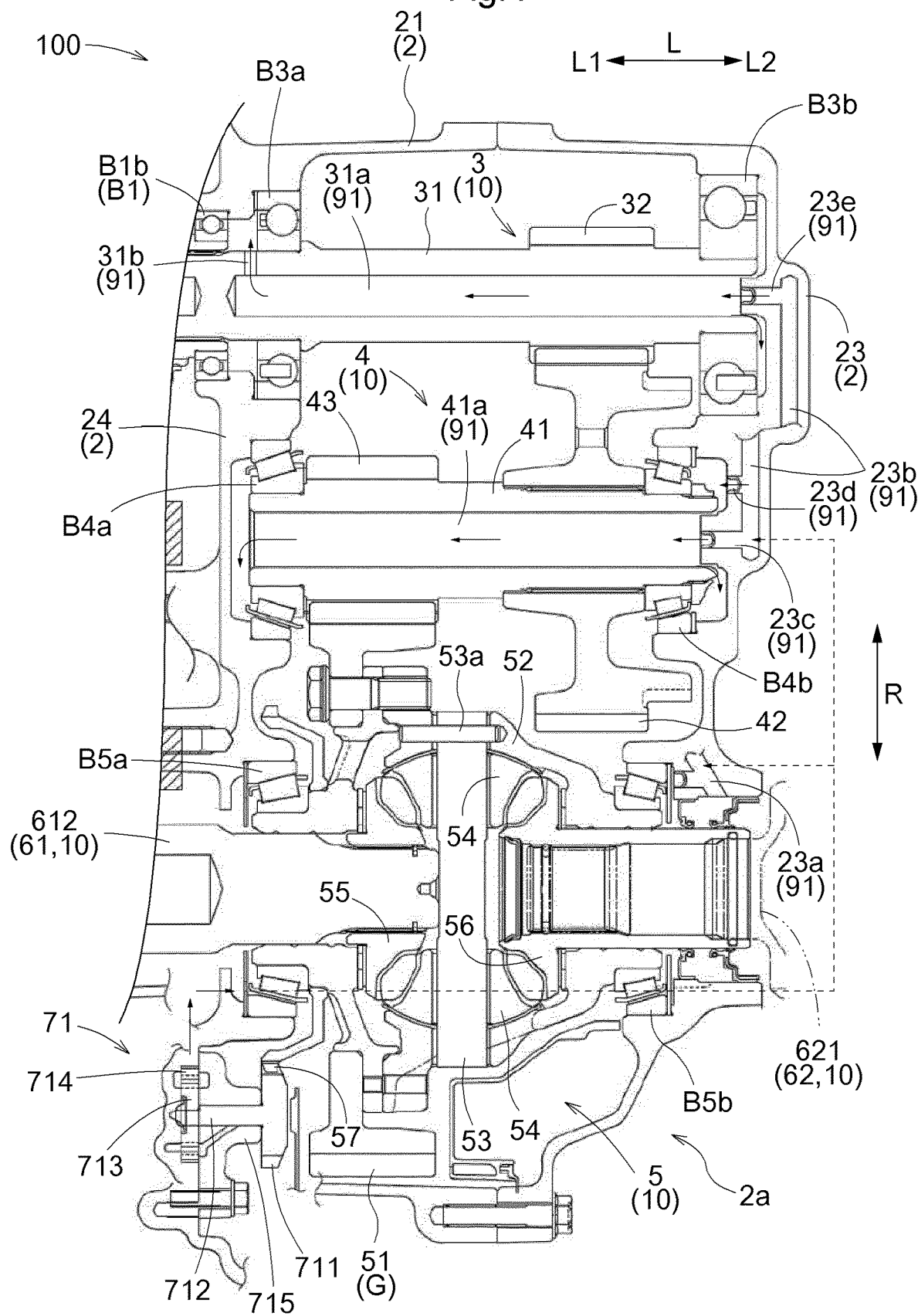
FIG. 4 is a diagram showing a part of the first oil passage of the vehicle drive device according to the embodiment.

As shown in FIGS. 3 and 4, the vehicle drive device 100 includes a first oil passage 91 and a second oil passage 92 that are independent of each other.

The first oil passage 91 is an oil passage that supplies oil discharged from the first hydraulic pump 71 to the rotor bearing B1 that supports the rotor shaft 122 such that the rotor shaft 122 is rotatable. In the present embodiment, the first oil passage 91 includes an oil passage that supplies oil discharged from the first hydraulic pump 71 to the plurality of bearings that supports the plurality of rotating members included in the drive transmission mechanism 10 such that the plurality of rotating members is rotatable. That is, the first oil passage 91 supplies oil discharged from the first hydraulic pump 71 to: the first rotor bearing B1*a* and the second rotor bearing B1*b* that support the rotor shaft 122 such that the rotor shaft 122 is rotatable; the first input bearing B3*a* and the second input bearing B3*b* that support the input shaft 31 such that the input shaft 31 is rotatable; the first counter bearing B4*a* and the second counter bearing B4*b* that support the counter shaft 41 such that the counter shaft 41 is rotatable; the first differential bearing B5*a* and the second differential bearing B5*b* that support the differential case 52 such that the differential case 52 is rotatable; and the output bearing B6 that supports the relay member 612 such that the relay member 612 is rotatable, to lubricate these bearings. Thus, the first oil passage 91 and the first hydraulic pump 71 constitutes a hydraulic circuit for lubrication.

The second oil passage 92 is an oil passage that supplies oil discharged from the second hydraulic pump 72 to the inner peripheral surface 122*d* of the rotor shaft 122. The second oil passage 92 and the second hydraulic pump 72 constitute a hydraulic circuit for cooling the rotary electric machine 1. Thus, the second oil passage 92 is configured to supply to a cooling target portion CP of the rotary electric machine 1. In the present embodiment, the cooling target portion CP includes the outer peripheral surface 111*a* of the stator core 111 and the coil end portions 112, in addition to the inner peripheral surface 122*d* of the rotor shaft 122. That is, in the present embodiment, the second oil passage 92 includes an oil passage that supplies oil discharged from the second hydraulic pump 72 to the outer peripheral surface 111*a* of the stator core 111 and an oil passage that supplies the oil to the coil end portions 112.

Hereinafter, the flow of oil in the first oil passage 91 of the present embodiment will be described with reference to FIGS. 3 and 4. Solid line arrows and broken line arrows in FIGS. 3 and 4 indicate the flow of oil.

As shown in FIG. 3, a part of the oil discharged from the first hydraulic pump 71 flows along the inner surface of the peripheral wall portion 21 of the case 2 toward the first side L1 in the axial direction and reaches the output bearing B6. Further, another part of the oil discharged from the first hydraulic pump 71 reaches the first rotor bearing B1*a* through a lubricating oil passage 22*a* provided in the first side wall portion 22 of the case 2.

On the other hand, as shown in FIG. 4, yet another part of the oil discharged from the first hydraulic pump 71 flows toward the second side L2 in the axial direction and reaches the first differential bearing B5*a*. Further, a part of the oil discharged from the first hydraulic pump 71 and flowing toward the second side L2 in the axial direction is supplied to each of a first lubricating oil passage 23*a* and a second lubricating oil passage 23*b* provided in the second side wall portion 23 of the case 2. The oil supplied to the first lubricating oil passage 23*a* reaches the second differential bearing B5*b* through the first lubricating oil passage 23*a*. On the other hand, the oil supplied to the second lubricating oil passage 23*b* flows into a first branch oil passage 23*c*, a second branch oil passage 23*d*, and a third branch oil passage 23*e* that are branched from the second lubricating oil passage 23*b*.

The first branch oil passage 23*c* communicates with the counter shaft oil passage 41*a* through the opening of the counter shaft 41 on the second side L2 in the axial direction. Therefore, the oil that has flowed into the first branch oil passage 23*c* is supplied to the counter shaft oil passage 41*a* through the first branch oil passage 23*c*. The oil supplied to the counter shaft oil passage 41*a* flows through the counter shaft oil passage 41*a* toward the first side L1 in the axial direction, and passes through the opening of the counter shaft 41 on the first side L1 in the axial direction, and flows to the outside of the counter shaft 41. Then, the oil that has flowed out of the counter shaft 41 reaches the first counter bearing B4*a*.

On the other hand, the oil that has flowed into the second branch oil passage 23*d* reaches the second counter bearing B4*b* through the second branch oil passage 23*d*. A part of the oil supplied to the counter shaft oil passage 41*a* also reaches the second counter bearing B4*b* through a gap between the counter shaft 41 and the second side wall portion 23.

The third branch oil passage 23*e* communicates with the input shaft oil passage 31*a* through the opening of the input shaft 31 on the second side L2 in the axial direction. Therefore, the oil that has flowed into the third branch oil passage 23*e* is supplied to the input shaft oil passage 31*a* through the third branch oil passage 23*e*.

A part of the oil supplied to the input shaft oil passage 31*a* flows through the input shaft oil passage 31*a* toward the first side L1 in the axial direction. Then, the oil that has reached the end portion of the input shaft oil passage 31*a* on the first side L1 in the axial direction flows through the supply oil passage 31b provided so as to pass through the input shaft 31 in the radial direction R, and flows to the outside of the input shaft 31. Here, the supply oil passage 31b is provided such that the space surrounded by the second rotor bearing B1b, the first input bearing B3a, the case 2, and the input shaft 31 communicates with the input shaft oil passage 31a. Therefore, the oil that has flowed out of the input shaft 31 reaches each of the second rotor bearing B1b and the first input bearing B3a.

On the other hand, the rest of the oil supplied to the input shaft oil passage 31a reaches the second input bearing B3b through a gap between the input shaft 31 and the second side wall portion 23.

As described above, in the present embodiment, the first oil passage 91 includes the lubricating oil passage 22a, the first lubricating oil passage 23a, the second lubricating oil passage 23b, the first branch oil passage 23c, the second branch oil passage 23d, the third branch oil passage 23e, the counter shaft oil passage 41a, the input shaft oil passage 31a, and the supply oil passage 31b. The lubricating oil passage 22a corresponds to the "oil passage provided in the first side wall portion 22". The first lubricating oil passage 23a, the second lubricating oil passage 23b, the first branch oil passage 23c, the second branch oil passage 23d, and the third branch oil passage 23e each correspond to the "oil passage provided in the second side wall portion 23". The first lubricating oil passage 23a, the second branch oil passage 23d, the input shaft oil passage 31a, the supply oil passage 31b, and the counter shaft oil passage 41a each correspond to the "oil passage that supplies oil discharged from the first hydraulic pump 71 to the plurality of bearings that supports the plurality of rotating members included in the drive transmission mechanism 10 such that the plurality of rotating members is rotatable".

Hereinafter, the flow of oil in the second oil passage 92 of the present embodiment will be described with reference to FIG. 3.

As shown in FIG. 3, the oil discharged from the second hydraulic pump 72 is cooled by an oil cooler 73. The oil cooler 73 is provided with, for example, a pipe through which oil flows, and is configured to perform heat exchange between the refrigerant (for example, coolant, air, and the like) flowing outside the pipe and the oil inside the pipe so as to cool the oil. Thus, in the present embodiment, the second oil passage 92 is provided with the oil cooler 73 for cooling oil. On the other hand, the first oil passage 91 is not provided with an oil cooler for cooling oil.

The oil cooled by the oil cooler 73 is supplied to a cooling oil passage 22b provided in the first side wall portion 22 of the case 2. The oil supplied to the cooling oil passage 22b flows into each of a first connecting oil passage 22c connected to an inner supply oil passage 81a and a second connecting oil passage 22d connected to an outer supply oil passage 82a.

The oil that has flowed into the first connecting oil passage 22c is supplied to the inner supply oil passage 81a through the first connecting oil passage 22c. The inner supply oil passage 81a is an oil passage provided in an inner supply member 81. The inner supply member 81 is disposed inside the rotary electric machine 1 in the radial direction R. Specifically, the inner supply member 81 is disposed inside the rotor shaft 122 in the radial direction R. That is, the inner supply member 81 is disposed inside the rotor shaft oil passage 122a. The inner supply member 81 is provided so as to extend in the axial direction L. The inner supply member 81 has a tubular shape with the end surface on the first side L1 in the axial direction being open. The internal space of the inner supply member 81 functions as the inner supply oil passage 81a. The end portion of the inner supply member 81 on the first side L1 in the axial direction is fixed to the first side wall portion 22 of the case 2 such that the inner supply oil passage 81a and the first connecting oil passage 22c communicate with each other.

The oil supplied to the inner supply oil passage 81a flows through the inner supply oil passage 81a toward the second side L2 in the axial direction. Then, the oil in the inner supply oil passage 81a flows through a supply hole 81b provided so as to pass through the inner supply member 81 in the radial direction R, and flows to the outside of the inner supply member 81. A plurality of the supply holes 81b is arranged at intervals in the circumferential direction of the inner supply member 81 such that the inner supply oil passage 81a and the rotor shaft oil passage 122a communicate with each other.

The oil that has flowed out of the inner supply member 81 is supplied to the rotor shaft oil passage 122a. In other words, the oil that has flowed out of the inner supply member 81 is supplied to the inner peripheral surface 122d of the rotor shaft 122 that constitutes the rotor shaft oil passage 122a. The oil supplied to the inner peripheral surface 122d of the rotor shaft 122 performs heat exchange with the permanent magnet 123 via the rotor shaft 122 and the rotor core 121 so as to cool the permanent magnet 123. Thus, the cooling target portion CP of the rotary electric machine 1 to which the oil discharged from the second hydraulic pump 72 is supplied includes the inner peripheral surface 122d of the rotor shaft 122.

A part of the oil supplied to the rotor shaft oil passage 122a flows into each of a first supply oil passage 122b and a second supply oil passage 122c provided so as to pass through the rotor shaft 122 in the radial direction R. Here, the first supply oil passage 122b is provided at such a position that the first supply oil passage 122b overlaps the coil end portion 112 on the first side L1 in the axial direction, as seen in a radial direction along the radial direction R of the rotor shaft 122. Also, the second supply oil passage 122c is provided at such a position that the second supply oil passage 122c overlaps the coil end portion 112 on the second side L2 in the axial direction, as seen in a radial direction along the radial direction R of the rotor shaft 122. Therefore, as the rotor shaft 122 rotates, oil is sprayed from each of the first supply oil passage 122b and the second supply oil passage 122c toward the corresponding coil end portion 112. Then, the oil adhering to the coil end portions 112 cools the coil end portions 112. Thus, the cooling target portion CP of the rotary electric machine 1 to which the oil discharged from the second hydraulic pump 72 is supplied includes the coil end portions 112.

The oil that has flowed into the second connecting oil passage 22d is supplied to the outer supply oil passage 82a through the second connecting oil passage 22d. The outer supply oil passage 82a is an oil passage provided in an outer supply member 82. The outer supply member 82 is disposed above the rotary electric machine 1 in the vertical direction. Specifically, the outer supply member 82 is disposed above, in the vertical direction, the portions of the coil end portions 112 and the stator core 111 that overlap the outer supply member 82 as seen in the vertical direction. The outer supply member 82 is provided so as to extend in the axial direction L. The outer supply member 82 has a tubular shape with the end surface on the first side L1 in the axial direction being open. The internal space of the outer supply member 82 functions as the outer supply oil passage 82a. The end portion of the outer supply member 82 on the first side L1 in the axial direction is supported by the first side wall portion 22 of the case 2 such that the outer supply oil passage 82a and the second connecting oil passage 22d communicate with each other. On the other hand, the end portion of the outer supply member 82 on the second side L2 in the axial direction is supported by the partition wall portion 24 of the case 2.

The oil supplied to the outer supply oil passage 82a flows through the outer supply oil passage 82a toward the second side L2 in the axial direction. Then, the oil in the outer supply oil passage 82a falls through a first supply hole 82b and a second supply hole 82c provided so as to pass through the outer supply member 82 in the radial direction R.

The first supply hole 82b is arranged at a plurality of (two in the illustrated example) locations in the axial direction L so as to overlap the coil end portion 112 on the first side L1 in the axial direction and the coil end portion 112 on the second side L2 in the axial direction as seen in the vertical direction. The first supply holes 82b are arranged at intervals in the circumferential direction of the outer supply member 82. Therefore, a part of the oil in the outer supply oil passage 82a is dropped onto the coil end portions 112 through the first supply holes 82b. Then, the oil adhering to the coil end portions 112 cools the coil end portions 112.

The second supply hole 82c is arranged at such a position that the second supply hole 82c overlaps the stator core 111 as seen in the vertical direction. In the illustrated example, the second supply hole 82c is arranged at a plurality of (two in the illustrated example) locations in the axial direction L, and the second supply holes 82c are arranged at intervals in the circumferential direction of the outer supply member 82. Therefore, a part of the oil in the outer supply oil passage 82a is dropped onto the outer peripheral surface 111a of the stator core 111 through the second supply holes 82c. The oil dropped onto the outer peripheral surface 111a of the stator core 111 performs heat exchange with the coil wound around the stator core 111 via the stator core 111 so as to cool the coil. Thus, the cooling target portion CP of the rotary electric machine 1 to which the oil discharged from the second hydraulic pump 72 is supplied includes the outer peripheral surface 111a of the stator core 111.

As described above, in the present embodiment, the second oil passage 92 includes the cooling oil passage 22b, the first connecting oil passage 22c, the second connecting oil passage 22d, the inner supply oil passage 81a, the supply holes 81b, the rotor shaft oil passage 122a, the first supply oil passage 122b, the second supply oil passage 122c, the outer supply oil passage 82a, the first supply holes 82b, and the second supply holes 82c. The outer supply oil passage 82a, the first supply holes 82b, and the second supply holes 82c correspond to the "oil passage that supplies oil discharged from the second hydraulic pump 72 to the outer peripheral surface 111a of the stator core 111".

As described above, the first oil passage 91 and the second oil passage 92 are provided independently of each other except for the oil storage portion 2a. In other words, the first oil passage 91 and the second oil passage 92 are not connected to each other except for the oil storage portion 2a and are separated from each other. Therefore, in the vehicle drive device 100, the hydraulic circuit for lubrication and the hydraulic circuit for cooling are independent of each other. As a result, when supply of oil to either the cooling target portion CP of the rotary electric machine 1 or the plurality of bearings B1a, B1b, B3a, B3b, B4a, B4b, B5a, B5b, and B6 is unnecessary, it is possible to avoid supplying the oil to both of them. For example, when the vehicle equipped with the vehicle drive device 100 is traveling at high speed and the rotary electric machine 1 has a low load, the supply of oil from the second hydraulic pump 72 to the cooling target portion CP can be stopped. As a result, the energy loss due to the unnecessary driving of the second hydraulic pump 72 can be kept small, and therefore, the energy efficiency of the vehicle drive device 100 can be increased.

In general, the electric motor 72a for driving the second hydraulic pump 72 is a rotary electric machine smaller in size than the rotary electric machine 1 for driving the wheels W, and has a smaller maximum value of torque that can be output than the rotary electric machine 1. Therefore, in a low temperature environment where the viscosity of the oil is high, the second hydraulic pump 72 may not be able to properly pump up the oil immediately after the vehicle equipped with the vehicle drive device 100 starts traveling, for example. In particular, such a problem is likely to occur when a small electric motor is used as the electric motor 72a for the second hydraulic pump 72 in order to increase the energy efficiency of the vehicle drive device 100. Normally, however, in a low temperature environment where the viscosity of the oil is high, the temperature of the cooling target portion CP of the rotary electric machine 1 is also low and the need to cool the cooling target portion CP is low. Therefore, even with the configuration as in the present embodiment, there is almost no effect of the second hydraulic pump 72 that cannot properly pump up the oil.

Other Embodiments (1) In the above embodiment, the configuration has been described as an example, in which oil is supplied through the first oil passage 91 to all of the plurality of bearings that supports the plurality of rotating members included in the drive transmission mechanism 10 such that the plurality of rotating members is rotatable. However, the present disclosure is not limited to such a configuration, and a configuration may be adopted in which oil is not supplied through the first oil passage 91 to part or all of the plurality of bearings that supports the plurality of rotating members included in the drive transmission mechanism 10 such that the plurality of rotating members is rotatable.

(2) In the above embodiment, the configuration has been described as an example, in which the first oil passage 91 includes the oil passage provided in the first side wall portion 22 (lubricating oil passage 22a) and the oil passage provided in the second side wall portion 23 (first lubricating oil passage 23a, second lubricating oil passage 23b, first branch oil passage 23c, second branch oil passage 23d, and third branch oil passage 23e). However, the present disclosure is not limited to such a configuration, and a configuration may be adopted in which the first oil passage 91 includes only one of the oil passage provided in the first side wall portion 22 and the oil passage provided in the second side wall portion 23. Alternatively, a configuration may be adopted in which the first oil passage 91 does not include either the oil passage provided in the first side wall portion 22 or the oil passage provided in the second side wall portion 23.

(3) In the above embodiment, the configuration has been described as an example, in which the cooling target portion CP includes the coil end portions 112, the outer peripheral surface 111a of the stator core 111, and the inner peripheral surface 122d of the rotor shaft 122. However, the present disclosure is not limited to such a configuration, and a configuration may be adopted in which the cooling target portion CP does not include either or both of the coil end portions 112 and the outer peripheral surface 111a of the stator core 111. Alternatively, a configuration may be adopted in which the cooling target portion CP includes, for example, a surface constituting an oil passage provided inside the rotor core 121 so as to extend in the vicinity of the permanent magnet 123.

(4) In the above embodiment, the configuration has been described as an example, in which the rotor bearing B1 includes the first rotor bearing B1a that supports a portion of the rotor shaft 122 that projects from the rotor core 121 to the first side L1 in the axial direction such that the portion is rotatable, and the second rotor bearing B1b that rotatably supports a portion of the rotor shaft 122 that projects from the rotor core 121 to the second side L2 in the axial direction such that the portion is rotatable. However, the present disclosure is not limited to such a configuration, and for example, a configuration may be adopted in which at least one of the first rotor bearing B1a and the second rotor bearing B1b supports, from the inside in the radial direction R, a portion of the rotor shaft 122 that overlaps the rotor core 121 as seen in the radial direction along the radial direction R. Alternatively, a configuration may be adopted in which the rotor bearing B1 is composed of only one bearing, or includes three or more bearings.

(5) In the above embodiment, the configuration has been described as an example, in which the oil in the oil storage portion 2a that has been scraped up by the differential input gear 51 serving as the scraping gear G is supplied to the gear meshing portions of the plurality of gears included in the drive transmission mechanism 10. However, instead of or in addition to this configuration, a configuration may be adopted in which the oil in the first oil passage 91 is supplied to the gear meshing portions. Alternatively, the scraping gear G may be a gear other than the differential input gear 51.

(6) In the above embodiment, the configuration has been described as an example, in which the first hydraulic pump 71 is driven by the rotation of the differential case 52. However, the present disclosure is not limited to such a configuration, and for example, the first hydraulic pump 71 may be driven by the rotation of the input shaft 31, or may be driven by the rotation of the counter shaft 41.

(7) In the above embodiment, the configuration has been described as an example, in which the differential input gear 51 constitutes the maximum diameter portion of the differential gear mechanism 5. However, the present disclosure is not limited to such a configuration, and for example, a part of the differential case 52 may constitute the maximum diameter portion of the differential gear mechanism 5.

(8) In the above embodiment, the configuration has been described as an example, in which the first hydraulic pump 71 is disposed at such a position that the first hydraulic pump 71 overlaps the differential gear mechanism 5 as seen in the axial direction along the axial direction L. However, the present disclosure is not limited to such a configuration, and the first hydraulic pump 71 may be disposed at such a position that the first hydraulic pump 71 does not overlap the differential gear mechanism 5 as seen in the axial direction. In that case, a configuration may be adopted in which the first hydraulic pump 71 is disposed at such a position that the first hydraulic pump 71 overlaps the differential gear mechanism 5 as seen in the radial direction along the radial direction R of the differential gear mechanism 5.

(9) In the present embodiment, the configuration has been described as an example, in which the first hydraulic pump 71 is disposed more toward the rotary electric machine 1 side in the axial direction L (first side L1 in the axial direction) than the differential input gear 51 of the differential gear mechanism 5 and more toward the differential gear mechanism 5 side in the axial direction L (second side L2 in the axial direction) than the central portion of the rotary electric machine 1 in the axial direction L. However, the present disclosure is not limited to such a configuration, and for example, the first hydraulic pump 71 may be disposed more toward the second side L2 in the axial direction than the differential input gear 51, or may be disposed more toward the first side L1 in the axial direction than the central portion of the rotary electric machine 1 in the axial direction L.

(10) In the above embodiment, the configuration has been described as an example, in which the second hydraulic pump 72 is stopped when the temperature of the inner peripheral surface 122d of the rotor shaft 122 is equal to or lower than the specified value. However, the present disclosure is not limited to such a configuration, and for example, a configuration may be adopted in which the second hydraulic pump 72 is stopped when the temperature of the cooling target portion CP of the rotary electric machine 1 is equal to or lower than the specified value. Here, as the "temperature of the cooling target portion CP", when a plurality of portions is included in the cooling target portion CP, the average value, the maximum value, and the like thereof can be adopted. Further, the second hydraulic pump 72 may be constantly driven. In this case, for example, control may be performed such that when the temperature of the cooling target portion CP of the rotary electric machine 1 is equal to or lower than the specified value, the amount of oil discharged from the second hydraulic pump 72 is reduced.

(11) In the above embodiment, the configuration has been described as an example, in which the second oil passage 92 is provided with the oil cooler 73 and the first oil passage 91 is not provided with an oil cooler for cooling oil. However, the present disclosure is not limited to such a configuration, and for example, a configuration may be adopted in which the first oil passage 91 is provided with an oil cooler for cooling oil. Since the second oil passage 92 is an oil passage for cooling the cooling target portion CP of the rotary electric machine 1, it is preferable to provide the oil cooler 73 at least in the second oil passage 92.

(12) In the above embodiment, the configuration has been described as an example, in which the rotary electric machine 1 and the input member 3 are disposed on the first axis A1, the counter gear mechanism 4 is disposed on the second axis A2, and the differential gear mechanism 5 and the first and second output members 61 and 62 are disposed on the third axis A3. However, the present disclosure is not limited to such a configuration, and a configuration may be adopted in which part or all of these are disposed on a common axis. For example, a configuration may be adopted in which the rotary electric machine 1, the input member 3, the counter gear mechanism 4, the differential gear mechanism 5, the first output member 61, and the second output member 62 are disposed coaxially.

(13) The configurations disclosed in each of the above embodiments can be applied in combination with the configurations disclosed in other embodiments as long as there is no contradiction. With respect to other configurations, the embodiments disclosed herein are merely exemplary in all respects. Therefore, various modifications can be made as appropriate without departing from the scope of the present disclosure.

Outline of Embodiments Described Above

Hereinafter, the outline of the vehicle drive device (100) described above will be described.

A vehicle drive device (100) includes:

a rotary electric machine (1) having a stator core (111), a rotor core (121) rotatably supported with respect to the stator core (111), and a tubular rotor shaft (122) connected to the rotor core (121) so as to rotate integrally with the rotor core (121), and serving as a driving force source for a wheel (W);

a drive transmission mechanism (10) provided in a power transmission path (P) connecting the rotor shaft (122) and the wheel (W);

a first hydraulic pump (71) driven by a driving force transmitted through the power transmission path (P);

a second hydraulic pump (72) driven by a driving force source (72*a*) independent of the power transmission path (P);

a first oil passage (91) that supplies oil discharged from the first hydraulic pump (71) to a rotor bearing (B1) that supports the rotor shaft (122) such that the rotor shaft (122) is rotatable; and a second oil passage (92) that supplies oil discharged from the second hydraulic pump (72) to an inner peripheral surface (122*d*) of the rotor shaft (122).

According to this configuration, the first oil passage (91) and the first hydraulic pump (71) are provided as a hydraulic circuit for lubrication that supplies oil to the rotor bearing (B1) that supports the rotor shaft (122) of the rotary electric machine (1) such that the rotor shaft (122) is rotatable, and the second oil passage (92) and the second hydraulic pump (72) are provided as a hydraulic circuit for cooling that supplies oil to the inner peripheral surface (122*d*) of the rotor shaft (122). This enables lubrication of the rotor bearing (B1) and cooling of the inner peripheral surface (122*d*) of the rotor shaft (122) to be performed independently. Therefore, when lubrication of the rotor bearing (B1) is unnecessary, such as the case where the vehicle is stopped, the supply of oil from the first hydraulic pump (71) to the rotor bearing (B1) can be stopped, and when cooling of the inner peripheral surface (122*d*) of the rotor shaft (122) is unnecessary, such as the case where the temperature of the rotary electric machine (1) is low, the supply of oil from the second hydraulic pump (72) to the inner peripheral surface (122*d*) of the rotor shaft (122) can be stopped. That is, when the supply of oil to either the inner peripheral surface (122*d*) of the rotor shaft (122) or the rotor bearing (B1) is unnecessary, it is possible to avoid the oil from being supplied to both of them. As a result, the energy loss due to unnecessary driving of the hydraulic pump can be kept small, and therefore, the energy efficiency of the vehicle drive device (100) can be increased.

Here, the first oil passage (91) preferably includes an oil passage (31*a*, 31*b*, 41*a*, 23*a*, 23*d*) that supplies oil discharged from the first hydraulic pump (71) to a plurality of bearings (B3*a*, B3*b*, B4*a*, B4*b*, B5*a*, B5*b*, B6) that supports a plurality of rotating members (31, 41, 52, 612) included in the drive transmission mechanism (10) such that the plurality of rotating members is rotatable.

According to this configuration, oil can be supplied to the plurality of bearings (B3*a*, B3*b*, B4*a*, B4*b*, B5*a*, B5*b*, B6) that supports the plurality of rotating members (31, 41, 52, 612) that rotates during traveling of the vehicle such that the plurality of rotating members is rotatable, while the vehicle is traveling. That is, when lubrication of the plurality of bearings (B3*a*, B3*b*, B4*a*, B4*b*, B5*a*, B5*b*, B6) is necessary, it is possible to appropriately lubricate the bearings. On the other hand, when lubrication of the plurality of bearings (B3*a*, B3*b*, B4*a*, B4*b*, B5*a*, B5*b*, B6) is unnecessary, such as the case where the vehicle is stopped, the supply of oil to the bearings can be stopped. Therefore, the energy loss due to unnecessary driving of the hydraulic pump can further be kept small.

It is also preferable that the vehicle drive device (100) further include a case (2) that houses the rotary electric machine (1) and the drive transmission mechanism (10), the case (2) have a tubular peripheral wall portion (21) provided so as to surround an outside of the rotary electric machine (1) and the drive transmission mechanism (10) in a radial direction (R), a first side wall portion (22) disposed so as to close an opening of the peripheral wall portion (21) on one side in an axial direction (L), and a second side wall portion (23) disposed so as to close an opening of the peripheral wall portion (21) on another side in the axial direction (L), and the first oil passage (91) include an oil passage (22*a*) provided in the first side wall portion (22) and an oil passage (23*a*, 23*b*, 23*c*, 23*d*, 23*e*) provided in the second side wall portion (23).

This configuration facilitates supply of oil from the first oil passage (91) to the lubrication target, even in a configuration in which the lubrication target including the rotor bearing (B1) is disposed in areas inside the case (2) on both sides in the axial direction (L).

It is also preferable that the second oil passage (92) include an oil passage (82*a*, 82*b*, 82*c*) that supplies oil discharged from the second hydraulic pump (72) to an outer peripheral surface (111*a*) of the stator core (111).

According to this configuration, oil is supplied from the second oil passage (92) to the outer peripheral surface (111*a*) of the stator core (111) in addition to the inner peripheral surface (122*d*) of the rotor shaft (122). That is, the rotary electric machine (1) is cooled from both inside and outside in the radial direction (R). Thus, when cooling of the rotary electric machine (1) is necessary, it is possible to cool the rotary electric machine (1) efficiently.

It is also preferable that the rotor shaft (122) be disposed so as to project from the rotor core (121) to both sides in an axial direction (L), and the rotor bearing (B1) include a first rotor bearing (B1*a*) that supports a portion of the rotor shaft (122) that projects from the rotor core (121) to one side (L1) in the axial direction (L) such that the portion is rotatable, and a second rotor bearing (B1*b*) that supports a portion of the rotor shaft (122) that projects from the rotor core (121) to another side (L2) in the axial direction (L) such that the portion is rotatable.

According to this configuration, the rotor shaft (122) is rotatably supported by the first rotor bearing (B1*a*) and the second rotor bearing (B1*b*) at two locations that are relatively largely apart from each other in the axial direction (L). While the vehicle is traveling, oil is supplied from the first oil passage (91) to both the first rotor bearing (B1*a*) and the second rotor bearing (B1*b*). Thus, according to this configuration, the rotor shaft (122) can be appropriately lubricated as necessary while being appropriately supported by the first rotor bearing (B1*a*) and the second rotor bearing (B1*b*).

It is also preferable that the vehicle drive device (100) further include a case (2) inside which an oil storage portion (2*a*) for storing oil is provided and that houses the rotary electric machine (1) and the drive transmission mechanism (10), and to gear meshing portions of a plurality of gears (32, 42, 43, 51, 54, 55, 56) included in the drive transmission mechanism (10), at least one of oil of the first oil passage (91) and oil of the oil storage portion (2*a*) that is scraped up by a scraping gear (G) included in the plurality of gears (32, 42, 43, 51, 54, 55, 56) be supplied.

According to this configuration, oil is supplied to the gear meshing portions of the plurality of gears (32, 42, 43, 51, 54, 55, 56) included in the drive transmission mechanism (10) from at least one of the first oil passage (91) through which oil discharged from the first hydraulic pump (71) flows and the scraping gear (G) that scrapes up oil stored in the oil storage portion (2a), while the vehicle is traveling. Therefore, when lubrication of the gear meshing portions is necessary, it is possible to appropriately lubricate the gear meshing portions. On the other hand, when lubrication of the gear meshing portions is unnecessary, such as the case where the vehicle is stopped, the supply of oil to the gear meshing portions can be stopped. Thus, the energy loss due to the unnecessary supply of oil to the gear meshing portions can be kept small.

It is also preferable that the drive transmission mechanism (10) include a pair of output members (61, 62) that is drivingly connected to the wheel (W) and a differential gear mechanism (5) that distributes a driving force transmitted from the rotary electric machine (1) side to the pair of output members (61, 62), the differential gear mechanism (5) include a hollow differential case (52), and the first hydraulic pump (71) be driven by rotation of the differential case (52).

According to this configuration, the differential case (52) constantly rotates while the wheel (W) is rotating, that is, while the vehicle is traveling. Therefore, the first hydraulic pump (71) is constantly in a driven state while the vehicle is traveling. As a result, while the vehicle is traveling, oil can be supplied from the first oil passage (91) to the rotor bearing (B1), and the rotor bearing (B1) can be appropriately lubricated. Thus, it is possible to avoid insufficient lubrication of the rotor bearing (B1) while the vehicle is traveling.

It is also preferable that the drive transmission mechanism (10) include a pair of output members (61, 62) that is drivingly connected to the wheel (W) and a differential gear mechanism (5) that distributes a driving force transmitted from the rotary electric machine (1) side to the pair of output members (61, 62), with reference to an axial direction (L) and a radial direction (R) of the output members (61, 62), the rotary electric machine (1) be located on one side (L1) in the axial direction (L) with respect to a maximum diameter portion (51) that is a portion, in the differential gear mechanism (5), having a largest dimension in the radial direction (R), and the first hydraulic pump (71) be disposed so as to overlap the differential gear mechanism (5) as seen in an axial direction along the axial direction (L) while being disposed more toward the rotary electric machine (1) side in the axial direction (L) than the maximum diameter portion (51) of the differential gear mechanism (5) and more toward the differential gear mechanism (5) side in the axial direction (L) than a central portion of the rotary electric machine (1) in the axial direction (L).

According to this configuration, the first hydraulic pump (71) can be disposed utilizing a space overlapping the differential gear mechanism (5) as seen in the axial direction. As a result, it is possible to suppress the increase in size of the vehicle drive device (100) in the radial direction (R) when the first hydraulic pump (71) is disposed. Moreover, according to this configuration, the first hydraulic pump (71) is disposed more toward the rotary electric machine (1) side in the axial direction (L) than the maximum diameter portion (51) of the differential gear mechanism (5) and more toward the differential gear mechanism (5) side in the axial direction (L) than the central portion of the rotary electric machine (1) in the axial direction (L). That is, the first hydraulic pump (71) is disposed in a central area of the vehicle drive device (100) between the rotary electric machine (1) and the maximum diameter portion (51) of the differential gear mechanism (5) that are arranged so as to be offset from each other in the axial direction (L). As a result, the length in the axial direction (L) over which the first oil passage (91) that supplies oil to the rotor bearing (B1) extends can be kept small. Thus, the first oil passage (91) can be configured such that oil can be easily supplied to the rotor bearing (B1) in an appropriate manner.

It is also preferable that the second hydraulic pump (72) be stopped when a temperature of the inner peripheral surface (122d) of the rotor shaft (122) is equal to or lower than a specified value.

According to this configuration, the second hydraulic pump (72) can be appropriately stopped when cooling of the inner peripheral surface (122d) of the rotor shaft (122) is unnecessary. As a result, the energy loss due to unnecessary driving of the second hydraulic pump (72) can be kept small, and therefore, the energy efficiency of the vehicle drive device (100) can be increased.

It is also preferable that the second oil passage (92) be provided with an oil cooler (73) for cooling oil, and the first oil passage (91) be not provided with the oil cooler (73).

According to this configuration, the oil supplied from the second oil passage (92) to the cooling target portion (CP) of the rotary electric machine (1) can be appropriately cooled by the oil cooler (73). Thus, the cooling target portion (CP) of the rotary electric machine (1) can be effectively cooled. On the other hand, the oil supplied for lubricating the rotor bearing (B1) is less required to have a low temperature than the oil supplied to the inner peripheral surface (122d) of the rotor shaft (122). Therefore, according to this configuration, the first oil passage (91) that supplies oil to the plurality of bearings (B1a, B1b, B3a, B3b, B4a, B4b, B5a, B5b, B6) is not provided with the oil cooler (73), so that the pressure loss of the oil flowing in the first oil passage (91) can be reduced. As a result, the energy required for driving of the first hydraulic pump (71) can be kept small, and therefore, the energy efficiency of the vehicle drive device (100) can be increased.

INDUSTRIAL APPLICABILITY

The techniques according to the present disclosure can be used for a vehicle drive device including a rotary electric machine serving as a driving force source for wheels, a drive transmission mechanism provided in a power transmission path connecting the rotary electric machine and the wheels, and a first hydraulic pump driven by a driving force transmitted through the power transmission path, and a second hydraulic pump driven by a dedicated driving force source independent of the power transmission path.

DESCRIPTION OF THE REFERENCE NUMERALS

100: vehicle drive device
1: rotary electric machine
122: rotor shaft
10: drive transmission mechanism
61: first output member
62: second output member
71: first hydraulic pump
72: second hydraulic pump
91: first oil passage
92: second oil passage B1: rotor bearing
P: power transmission path
W: wheel
L: axial direction
R: radial direction

The invention claimed is:

1. A vehicle drive device comprising:
a rotary electric machine having a stator core, a rotor core rotatably supported with respect to the stator core, and a tubular rotor shaft connected to the rotor core so as to rotate integrally with the rotor core, and serving as a driving force source for a wheel;
a drive transmission mechanism provided in a power transmission path connecting the rotor shaft and the wheel;
a first hydraulic pump driven by a driving force transmitted through the power transmission path;
a second hydraulic pump driven by a driving force source independent of the power transmission path;
a first oil passage that supplies oil discharged from the first hydraulic pump to a rotor bearing that supports the rotor shaft such that the rotor shaft is rotatable; and
a second oil passage that supplies oil discharged from the second hydraulic pump to an inner peripheral surface of the rotor shaft, wherein:
the rotor shaft is disposed so as to project from the rotor core to both sides in an axial direction; and
the rotor bearing includes a first rotor bearing that supports a portion of the rotor shaft that projects from the rotor core to one side in the axial direction such that the portion is rotatable, and a second rotor bearing that supports a portion of the rotor shaft that projects from the rotor core to another side in the axial direction such that the portion is rotatable.

2. The vehicle drive device according to claim 1, wherein the first oil passage includes an oil passage that supplies oil discharged from the first hydraulic pump to a plurality of bearings that supports a plurality of rotating members included in the drive transmission mechanism such that the plurality of rotating members is rotatable.

3. The vehicle drive device according to claim 1, further comprising a case that houses the rotary electric machine and the drive transmission mechanism, wherein:
the case has a tubular peripheral wall portion provided so as to surround an outside of the rotary electric machine and the drive transmission mechanism in a radial direction, a first side wall portion disposed so as to close an opening of the peripheral wall portion on one side in the axial direction, and a second side wall portion disposed so as to close an opening of the peripheral wall portion on another side in the axial direction; and
the first oil passage includes an oil passage provided in the first side wall portion and an oil passage provided in the second side wall portion.

4. The vehicle drive device according to claim 1, wherein the second oil passage includes an oil passage that supplies oil discharged from the second hydraulic pump to an outer peripheral surface of the stator core.

5. The vehicle drive device according to claim 1, further comprising a case inside which an oil storage portion for storing oil is provided and that houses the rotary electric machine and the drive transmission mechanism, wherein to gear meshing portions of a plurality of gears included in the drive transmission mechanism, at least one of oil of the first oil passage and oil of the oil storage portion that is scraped up by a scraping gear included in the plurality of gears is supplied.

6. The vehicle drive device according to claim 1, wherein:
the drive transmission mechanism includes a pair of output members that is drivingly connected to the wheel and a differential gear mechanism that distributes a driving force transmitted from the rotary electric machine side to the pair of output members;
the differential gear mechanism includes a hollow differential case; and
the first hydraulic pump is driven by rotation of the differential case.

7. The vehicle drive device according to claim 1, wherein:
the drive transmission mechanism includes a pair of output members that is drivingly connected to the wheel and a differential gear mechanism that distributes a driving force transmitted from the rotary electric machine side to the pair of output members;
with reference to the axial direction and a radial direction of the output members,
the rotary electric machine is located on one side in the axial direction with respect to a maximum diameter portion that is a portion, in the differential gear mechanism, having a largest dimension in the radial direction; and
the first hydraulic pump is disposed so as to overlap the differential gear mechanism as seen in the axial direction along the axial direction while being disposed more toward the rotary electric machine side in the axial direction than the maximum diameter portion of the differential gear mechanism and more toward the differential gear mechanism side in the axial direction than a central portion of the rotary electric machine in the axial direction.

8. The vehicle drive device according to claim 1, wherein the second hydraulic pump is stopped when a temperature of the inner peripheral surface of the rotor shaft is equal to or lower than a specified value.

9. The vehicle drive device according to claim 1, wherein:
the second oil passage is provided with an oil cooler for cooling oil; and
the first oil passage is not provided with the oil cooler.

* * * * *